United States Patent
Cui et al.

(10) Patent No.: US 9,121,647 B2
(45) Date of Patent: Sep. 1, 2015

(54) SYSTEM AND PROCESS FOR STORING COLD ENERGY

(75) Inventors: Jun Cui, Richland, WA (US); Jamelyn D. Holladay, Kennewick, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 1085 days.

(21) Appl. No.: 13/076,257

(22) Filed: Mar. 30, 2011

(65) Prior Publication Data

US 2012/0247706 A1    Oct. 4, 2012

(51) Int. Cl.
| | | |
|---|---|---|
| F25D 3/00 | (2006.01) | |
| F28D 20/00 | (2006.01) | |
| F25B 23/00 | (2006.01) | |
| C22C 14/00 | (2006.01) | |
| C22C 19/03 | (2006.01) | |

(52) U.S. Cl.
CPC ............ *F28D 20/0056* (2013.01); *C22C 14/00* (2013.01); *C22C 19/03* (2013.01); *F25B 23/00* (2013.01); *Y02E 60/142* (2013.01)

(58) Field of Classification Search
CPC .............................. F28D 20/0056; F25B 23/00
USPC ........................................................... 165/10
See application file for complete search history.

(56) References Cited

U.S. PATENT DOCUMENTS

| | | | | |
|---|---|---|---|---|
| 3,036,444 | A * | 5/1962 | Cochran | 62/467 |
| 6,367,281 | B1 * | 4/2002 | Hugenroth | 62/467 |
| 2007/0227544 | A1 * | 10/2007 | Swann et al. | 128/831 |
| 2008/0254346 | A1 * | 10/2008 | Burstall et al. | 429/72 |
| 2009/0200007 | A1 * | 8/2009 | Foy et al. | 165/287 |

FOREIGN PATENT DOCUMENTS

| | | |
|---|---|---|
| WO | 9927313 | 6/1999 |
| WO | 02084185 A1 | 10/2002 |

OTHER PUBLICATIONS

International Search Report/Written Opinion for International Application No. PCT/US2012/021531, International Filing Date Jan. 17, 2012, Date of Mailing May 23, 2012.
Vives, E., et al., Temperature contour maps at the strain-induced martensitic transition of a Cu—Zn—Al shape memory single crystal, Applied Physics Letters. vol. 98, No. 1, 011902, Jan. 2011.

* cited by examiner

*Primary Examiner* — Cassey D Bauer
(74) *Attorney, Agent, or Firm* — James D. Matheson

(57) ABSTRACT

A system and method for storing cold energy are detailed. The system includes a solid refrigerant in a structured form that stores cold energy. Upon deformation, the solid refrigerant transforms into a high energy deformed state from a low energy non-deformed state. In the deformed state, the solid refrigerant stores cold energy that can be released to a desired location upon demand.

10 Claims, 7 Drawing Sheets

SYSTEM AND PROCESS FOR STORING COLD ENERGY

FIELD OF THE INVENTION

The present invention relates generally to thermodynamically stable energy storing systems and methods. More particularly, the invention relates to a system and process for storing cold energy.

BACKGROUND OF THE INVENTION

In the United Stated (U.S.), more than 90% of budding space cooling and refrigeration is provided by vapor compression (VC) based systems. Modern compressors are highly efficient, but are now approaching their theoretical and technological limits. In addition to the efficiency plateau, VC technology has environmental issues. For example, VC refrigerants such as hydrochlorofluorocarbons (HCFC) or halofluorocarbons (HFC) are a significant source of green house gas (GHG) emissions. Global warming potential (GWP) for VC refrigerants is as high as 1000 times that of $CO_2$. According to 2008 Buildings Energy Data, with VC as the dominate technology, building space cooling and refrigeration will consume 7.46 quads of primary electricity and generate 447 million metric tons (MMT) of $CO_2$ emissions by the year 2030. This will be equivalent to ~5% of primary energy consumption and ~5% of $CO_2$ emissions in the U.S. alone. As such, there is an urgent need to develop new and affordable cooling technologies to enhance overall energy efficiencies and reduces GHG emissions. A number of alternative technologies are under development including electrocaloric, magnetocaloric, thermoacoustic, and thermoelectric. Magnetocaloric cooling (MC) is currently considered a front runner among these technologies due to its higher efficiency and elimination of HCFC/HFC refrigerants. However, MC is inherently expensive because of the requirement for large magnetic fields and rare earth materials. Recently, an entirely new type of solid-state cooling based on reversible martensitic transformation was disclosed by a group of researchers at the University of Maryland. The new cooling technology is referred to as "elastocaloric cooling" (EC) which utilizes super-elastic transformation of austenite. Compared to other cooling technologies, EC has three advantages: 1) It is environment friendly. EC uses solid refrigerants, which completely eliminates the need for HCFC/HFC refrigerants, 2) EC has a high efficiency. It has been shown that the COP (coefficient of performance) of a jugular refrigerant is 5.8 with a ΔT of about 12° C., and 3) EC is cost-effective. EC does not require hydrostatic pressure. Therefore, there is no need for hermetic seals. In addition, the working materials are inexpensive. These advantages positioned EC to challenge VC as a dominate cooling technology. EC technology is new. And, key characteristics of the technology have yet to be fully understood, but differences associated with the physics from other cooling technologies are obvious. These differences enable different applications and different system designs. The present invention relates to a new application of the EC technology and corresponding systems.

SUMMARY OF THE INVENTION

The invention includes a system and a process for storing cold energy. The system includes: a chamber that defines an environment for storing energy, a regenerator system for storing and releasing energy, and a heat exchange system for moving the energy in and out of the system.

In one embodiment, the process includes: 1) deforming (stressing) a preselected solid state material (referred hereafter as "solid refrigerant") at a given temperature ($T_0$) from a first phase (referred as the high temperature phase) that is thermodynamically stable without the applied stress at ($T_0$) to a second phase (referred as the low temperature phase) that is thermodynamically stable without the applied stress at a temperature lower than ($T_0$) and is thermodynamically stable with the applied stress at ($T_0$). Transformation of the solid refrigerant from the first phase to the second phase results in the release of a preselected quantity of latent heat due to the difference between the total free energy ($\Delta G°$) of the first phase and the second phase of the solid refrigerant, 2) keeping the temperature of the solid refrigerant at the given temperature by exchanging the just generated heat with the ambient, 3) retaining the solid refrigerant in the second phase for a preselected time to keep the solid refrigerant ready to absorb previously released latent heat. This step is analogous to storing cold energy that is equal to the previously released latent heat, 4) undeforming the solid refrigerant by unloading the stress previously applied to the solid refrigerant to transform the second phase to the first phase. Transformation of the solid refrigerant from the second phase to the first phase results in the absorption of latent heat that was previously released. This step is analogous to generating cold energy that is equal to the released latent heat, 5) cooling the heat exchange medium with the cold refrigerant, and 6) distributing the cold medium to cool a preselected environment, volume, or space location to a desired or preselected temperature.

In another embodiment, the process includes: 1) inducing transformation of the solid refrigerant to transform it from the high temperature phase to the low temperature phase by exposing the solid refrigerant to an ambient environment when the ambient temperature is sufficiently low for the low temperature phase to exist without the bias of mechanical energy. For example, in a desert, the temperature difference between daytime and nighttime temperatures can exceed 70° C. Similarly, in some embodiments, the high temperature phase of the solid refrigerant may be thermodynamically stable in the daytime but not thermodynamically stable in the nighttime. Likewise, in some embodiments, the low temperature phase may be thermodynamically stable at nighttime but not thermodynamically stable during the daytime, 2) retaining the solid refrigerant in the second phase for a preselected time. This step is analogous to storing the cold energy provided by a cold ambient environment. As the ambient temperature increases with time, the solid refrigerant becomes stressed by the retaining mechanism, 4) releasing the stress on the solid refrigerant by removing (e.g., unlocking) the retaining mechanism. The transformation of the solid refrigerant from the second phase to the first phase results in the absorption of latent heat. This step is analogous to generating cold energy equal to the released latent heat, 5) cooling the heat exchange medium with the cold refrigerant, and 6) distributing the cold medium to cool a preselected environment, volume, or space location to a desired or preselected temperature.

In another embodiment, the process includes: 1) energizing a preselected solid refrigerant in a structured form releasing a quantity of heat therefrom to heat an exchange medium in a first location, 2) equilibrating the heated exchange medium between the first location at a higher temperature and a second location at a lower temperature to establish a temperature equilibrium between the first location and the second location, 3) storing cold energy in the solid refrigerant in the first location, 4) de-energizing the solid refrigerant absorbing a quantity of heat to cool the exchange medium in the first location, and 5) distributing the cold exchange medium to cool a preselected location, device, or environment.

In one embodiment, the solid refrigerant is an alloy composed of two metals. In one embodiment, the alloy includes two metals, nickel (Ni) and titanium (Ti), with an atomic ratio given by (50−X):(50+X), where (X) varies from 0 to 10. In another embodiment, the solid refrigerant is an alloy composed of at least 3 metals. In other embodiments, the solid refrigerant is a multi-component alloy. Alloys can include, e.g., Cu, Al, Ni, Zn, Ti, Hf, Zr, Fe, Co, Mn, Ga, Bi, Sr, C, and combinations of these various members.

In one embodiment, the first phase is cubic and the second phase is monoclinic. In another embodiment, the first phase is tetragonal, rhombohedral, or orthorhombic. In yet another embodiment, the second phase is tetragonal, rhombohedral, or orthorhombic.

In a preferred embodiment, the solid refrigerant has a structured form or shape selected from rods, bars, wires, wafers, discs, plates, buttons, pellets, spheres, beads, particles, ribbons, meshes, tubes, tapes, pencils, or other structured forms, including combinations of these forms. In various embodiments, the structured forms are fashioned by a method selected from: pressing, pelletizing, casting, extruding, stretching, bending, twisting, including combinations of these processes.

In one embodiment, the solid refrigerant has a tolerance for deformation between about 0% and about 10%. In another embodiment, the solid refrigerant has a tolerance for deformation between about 0% and about 25%. In some embodiments, the solid refrigerant has a tolerance for deformation up to about 21% in one dimension. In some embodiments, the solid refrigerant has a tolerance for deformation between about 0% and about 100%.

In some embodiments, the system stores cold energy at night when energy cost is low, and deploys the shared cold energy during the daytime when energy cost is high.

A more complete appreciation of the invention will be readily obtained by reference to the following description of the accompanying drawings in which like numerals in different figures represent the same structures or elements.

DETAILED DESCRIPTION OF THE INVENTION

Figure 1:
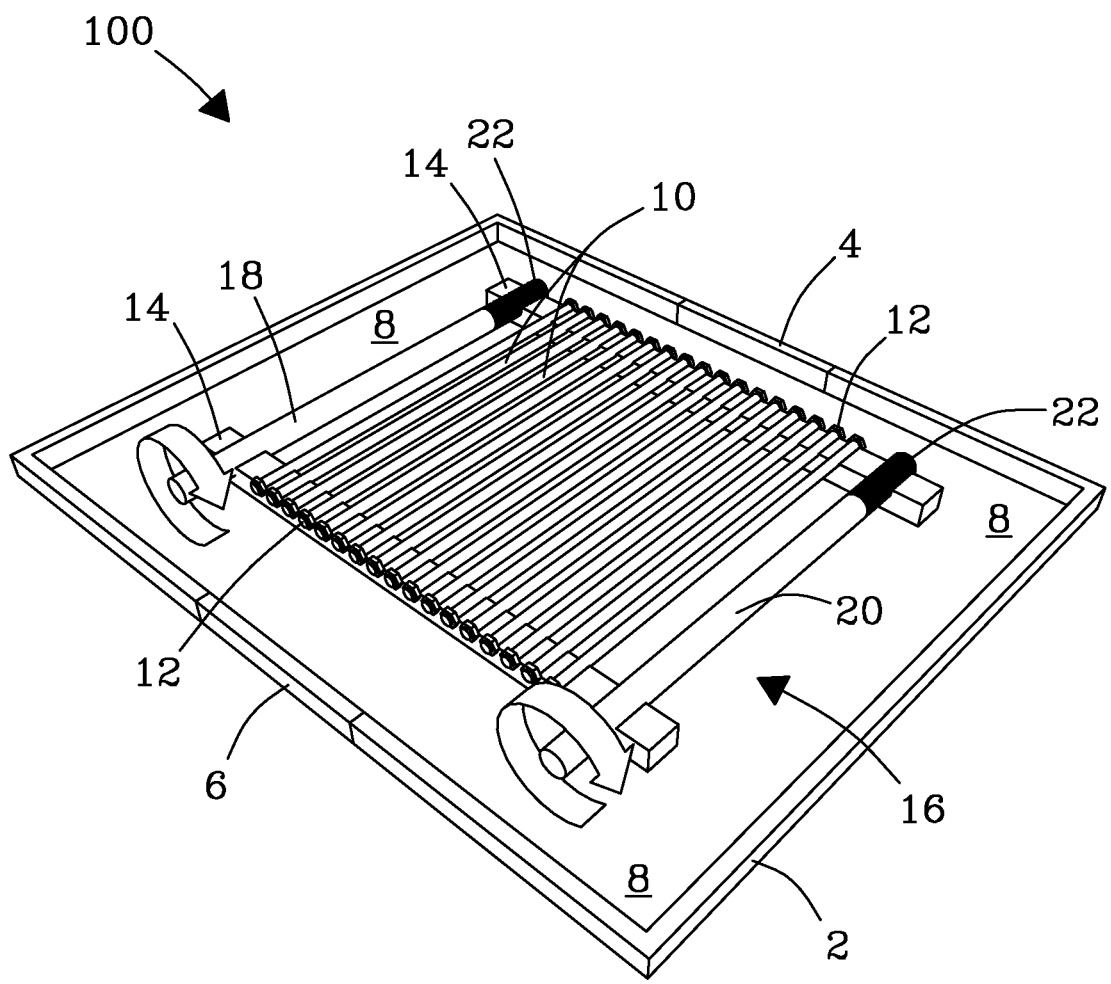
FIG. 1 shows an exemplary cold storage system, according to one embodiment of the invention.

The present invention includes a system and process for storing cold energy. The system and method of the invention differ from other energy storage methods known in the conventional art in that they do not involve storing electric energy, chemical energy, or mechanical energy. Storing cold energy in accordance with the invention involves release or absorption of latent heat (Q) associated with a reversible solid-to-solid phase transformation. The parent (or first) phase is referred to "austenite". The product (or second) phase is referred to as "martensite". Temperature at which austenite is thermodymically stable is higher than that of martensite, and the crystallographic symmetry of austenite is higher than that of martensite. The phase transformation can be induced by a temperature change or a stress, meaning the phase transformation can be driven by both thermal energy and mechanical energy. While the present invention is described herein with reference to the preferred embodiments thereof, it should be understood that the invention is not limited thereto, and various alternatives in form and detail may be made therein without departing from the scope of the invention. No limitations are intended. FIG. 1 shows an exemplary system 100 for storing cold energy, according to one embodiment of the invention. System 100 includes a containment chamber 2 or other suitable enclosure environment constructed of a thermally insulating material. An exemplary construction includes an exterior metal casing that is insulated with an inner insulated lining constructed, e.g., of a plastic material, glass insulating fibers, or another thermally insulating material. No limitations are intended. Chamber 2 includes at least one entrance 4 and at least one exit 6 that allows exchange of a heat exchange medium 8 into, or out of, chamber 2. Number of entrances 4 and exits 6 installed in chamber 2 is not limited. In addition, entrance 4 and exit 6 may be opened or closed to control release of heat energy or cold energy from chamber 2. In the present embodiment, solid refrigerant in chamber 2 is in the form of structured rods 10. While rods 10 are described hereafter, shapes and forms of solid refrigerant are not intended to be limited thereto. In the present embodiment, rods 10 have exemplary dim pensions that include, e.g., preselected length (e.g., 2-meters) and a preselected diameter (e.g., 1-cm diameter), but dimensions are not intended to be limiting, Rods 10 are coupled horizontally to adjacent rods 10 via fasteners 12 positioned at preselected locations along, or at distal ends of, each rod 10 and mount horizontally to respective array supports 14 to form a deformation array 16 (e.g., a parallel array). Location of fasteners 12 is not limited as will be understood by those of ordinary skill in the manufacturing arts. Fasteners 12 include, but are not limited to, e.g., hangers, clamps, clips, pins, bolts, screws, staples, hooks, supports, or other suitable mounting means, including combinations of these various fasteners. While deformation array 16 includes horizontally oriented rods 10, orientation of rods 10 is not limited thereto. For example, in some other embodiments, rods 10 may be mounted vertically forming a vertical deformation array 16. Other suitable structures and configurations for the solid refrigerant can be envisioned. As such, all configurations or arrangements of the solid refrigerant as will be envisioned by those of ordinary skill in the art in view of this disclosure are within the scope of the invention. No limitations are intended. Deformation array 16 couples to an upper screw drive 18 and a lower screw drive 20 that (define a drive assembly 18). Screw drives 18 and 20 couple to deformation array 16 via array supports 14. Array supports 14 provider counting support for rods 10 in array 16. Screw drives 18 and 20 include a tension member 22 (e.g., a spring) positioned to deliver a deformation stress to rods 10 (and the solid refrigerant therein). Deformation of rods 10 (and solid refrigerant therein) is obtained in concert with rotation of screw drives 18 and 20. For example, screw drives 18 and 20 rotate incrementally, e.g., in a clockwise direction to deliver a progressively increasing stress to rods 10 in concert with tension member 22 that deforms rods 10 and the solid refrigerant therein upon demand. Screw drives 18 and 20 rotate, e.g., in a counterclockwise direction to remove stress delivered to rods 10 and the solid refrigerant contained in the refrigerant rods 10, Rotation of screw drives 18 and 20 is provided, e.g., in concert with a drive motor (not shown), but mechanism for rotation is not limited thereto. Stress provided by upper (top) screw drive 18 and lower (bottom) screw drive 20 to refrigerant rods 10 physically deforms the solid refrigerant and transforms the solid refrigerant contained within rods 10 from a low-energy non-deformed (i.e., austenite) state to a high-energy deformed (martensite) state. Once the required deformation of the solid refrigerant in the rods 10 is obtained, screw drives 18 and 20 stop rotating and lock in position in concert with one or more locks (not shown) that maintain and retain the stress in, and corresponding deformation of, refrigerant rods 10. Upper screw drive 18 and lower screw drive 20 may be configured to rotate synchronously or non-synchronously, which allows the array 16 of refrigerant rods 10 to be deformed simultaneously or non-simultaneously. Screw drives 18 and 20 retain the deformation of the solid refrigerant in rods 10 until the stress to refrigerant rods 10 is released, e.g., by unlocking or releasing the locking mechanism. Chamber 2 contains a heat exchange medium 8 that allows extraction of thermal energy from the refrigerant rods 10. Examples of suitable heat exchange media 8 for use in conjunction with the invention include, but are not limited to, e.g., air, water, organic liquids including, e.g., ethanol, or other heat exchange media 8, including combinations of these various media. No limitations are intended. Chamber 2 further includes at least one entrance 4 and at least one exit 6 that provides a pathway for the heat exchange medium 8 to move in and out of chamber 2.

Figure 2:
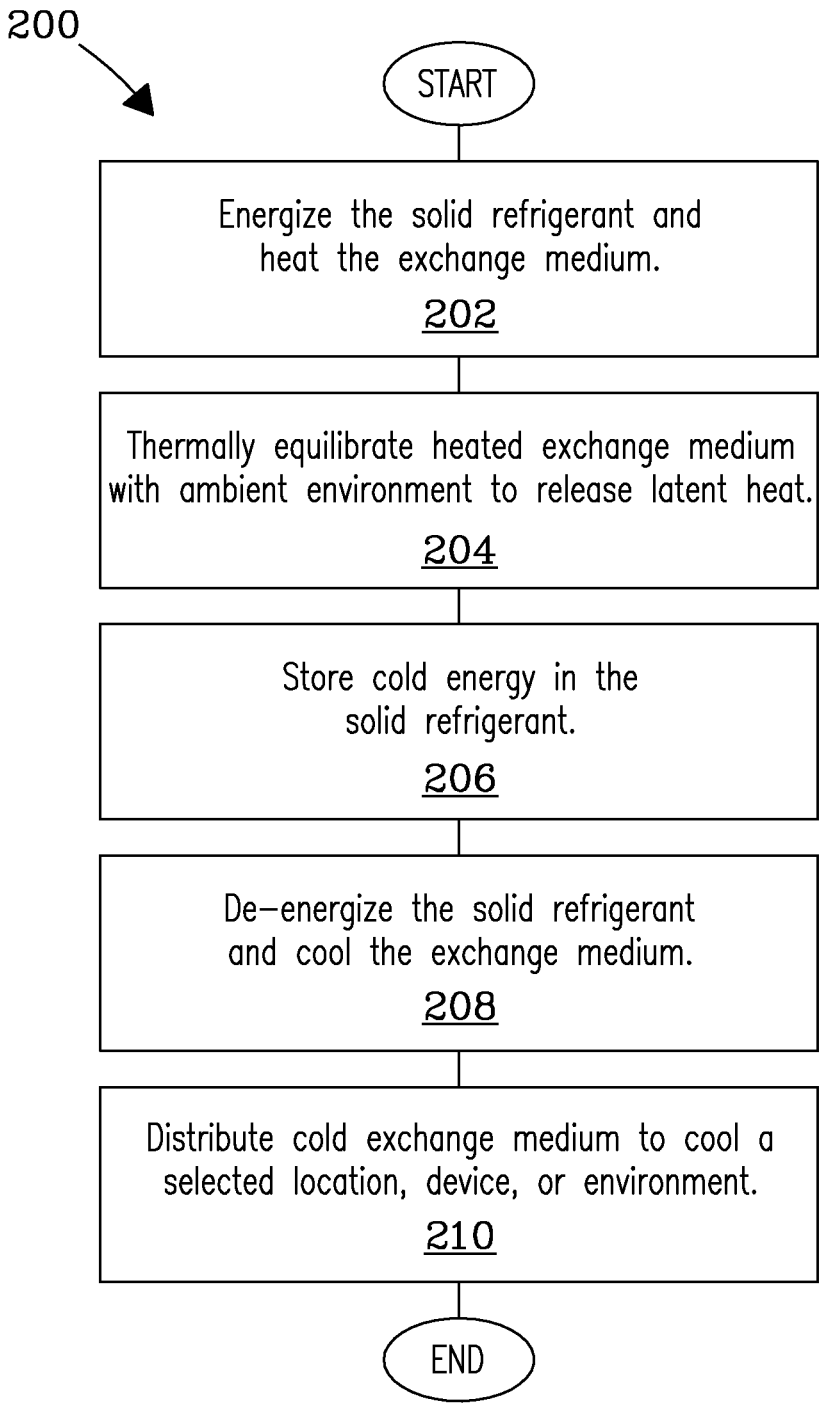
FIG. 2 presents exemplary steps of a process for storing cold, according to an embodiment of the process of the invention.
Figure 3A:
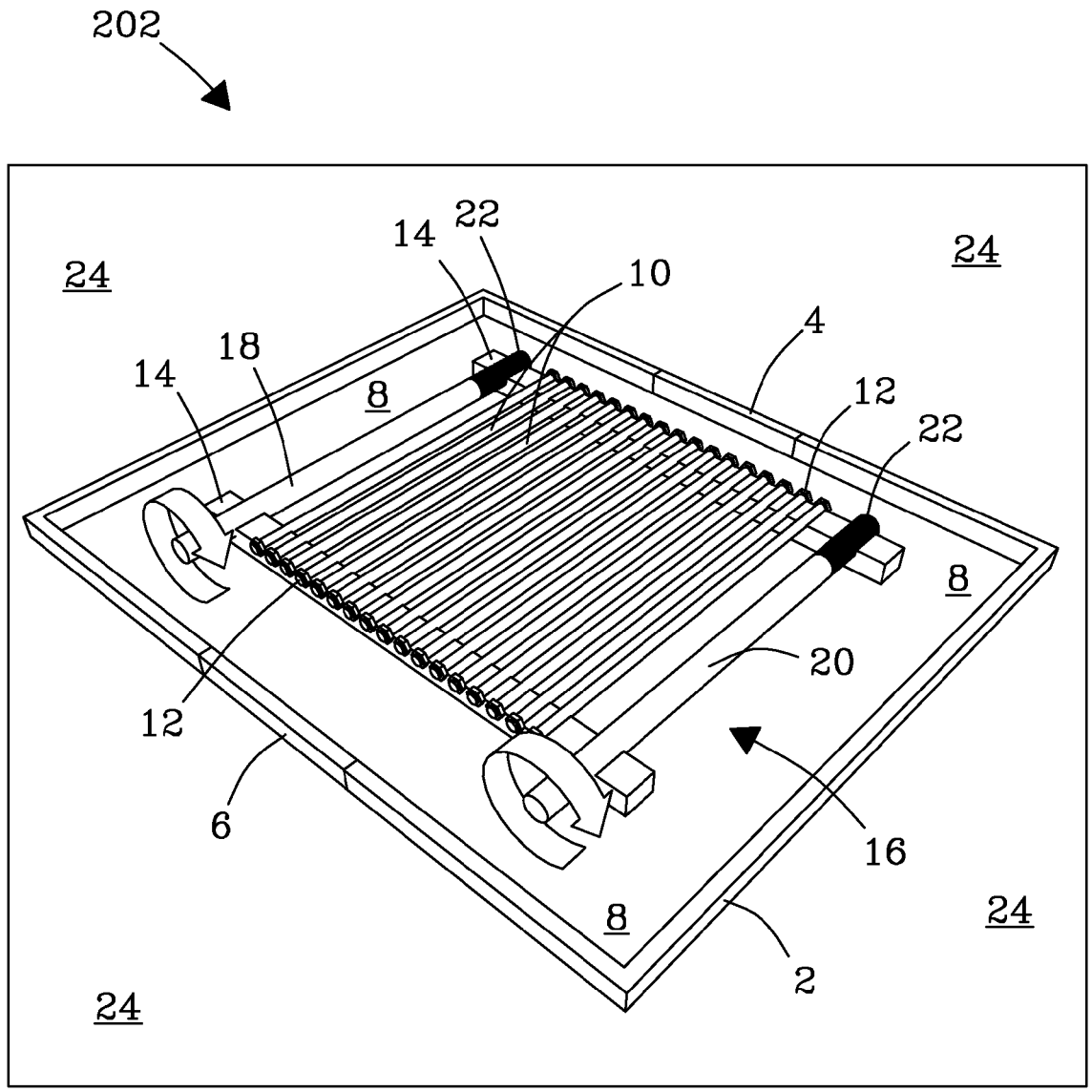
FIGS. 3a-3d illustrate exemplary process steps for energizing, heat releasing, cold storing, and cold releasing in accordance with an embodiment of the process of the invention.

FIG. 2 shows exemplary steps of a process 200 for storing cold, energy, according to an embodiment of the invention. {START}. In a first step {202} illustrated in FIG. 3a, refrigerant rods 10 containing solid refrigerant is energized. The term "energized" or "energizing" as used herein means the solid refrigerant in its structured (e.g., rod) form is deformed in such a way as to force the solid refrigerant from the non-deformed, low-energy austenite state into the high-energy Martensite state, or vice versa. In step {202}, entrances 4 and exits 6 to chamber 2 are closed. Rods 10 are mechanically deformed, e.g., in concert with one or more screw drives 18 and 20 (FIG. 1), which deforms the solid refrigerant in rods 10. This process serves to release latent heat ($Q_L$) from the solid refrigerant into chamber 2. Release of heat ($Q_L$) from rods 10 into chamber 2 energizes the solid refrigerant in rods 10, preparing the solid refrigerant to absorb heat ($Q_A$) in a subsequent step. Total heat ($Q_T$) released by the rods 10 in deformation array 16 into chamber 2 is given by Equation [1]:

$$Q_T = (Q_L) \times (V \text{ or } m) \quad [1]$$

Here, ($Q_L$) is the quantity of latent heat (J/g or J/cc) released by rods 10, (V) is the volume (e.g., cc) of solid refrigerant in rods 10, and (m) is the mass (e.g., grams) of solid refrigerant in rods 10. Rods 10 in the Martensite state have preferred temperatures from about 23° C. to about 91° C., but are not intended to be limited thereto. Change in temperature of the heat exchange medium 8 by release of heat ($Q_L$) from rods 10 is given by Equation [2]:

$$\Delta T = Q_A / Cp \quad [2]$$

Figure 3B:
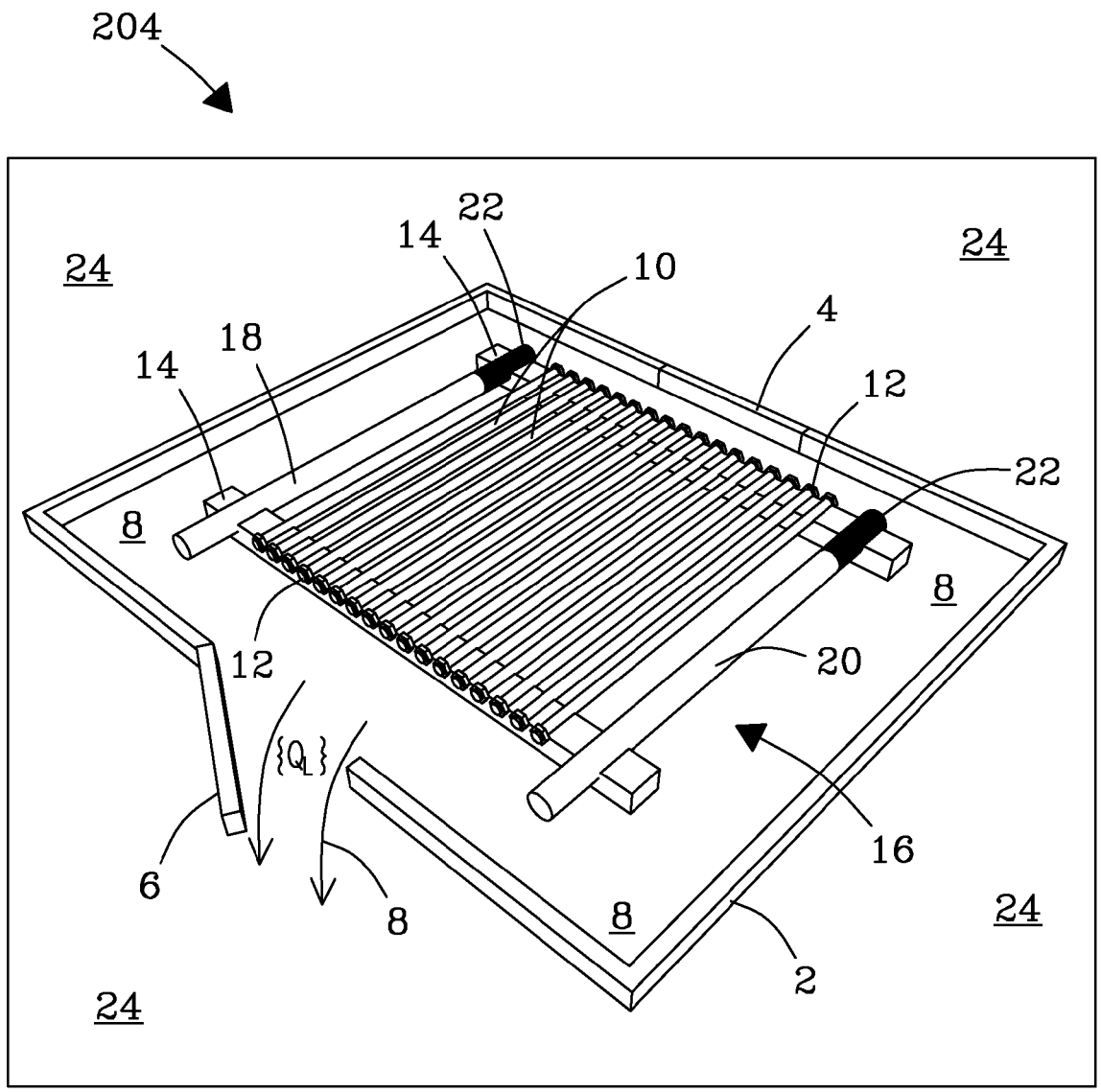
Figure 3C:
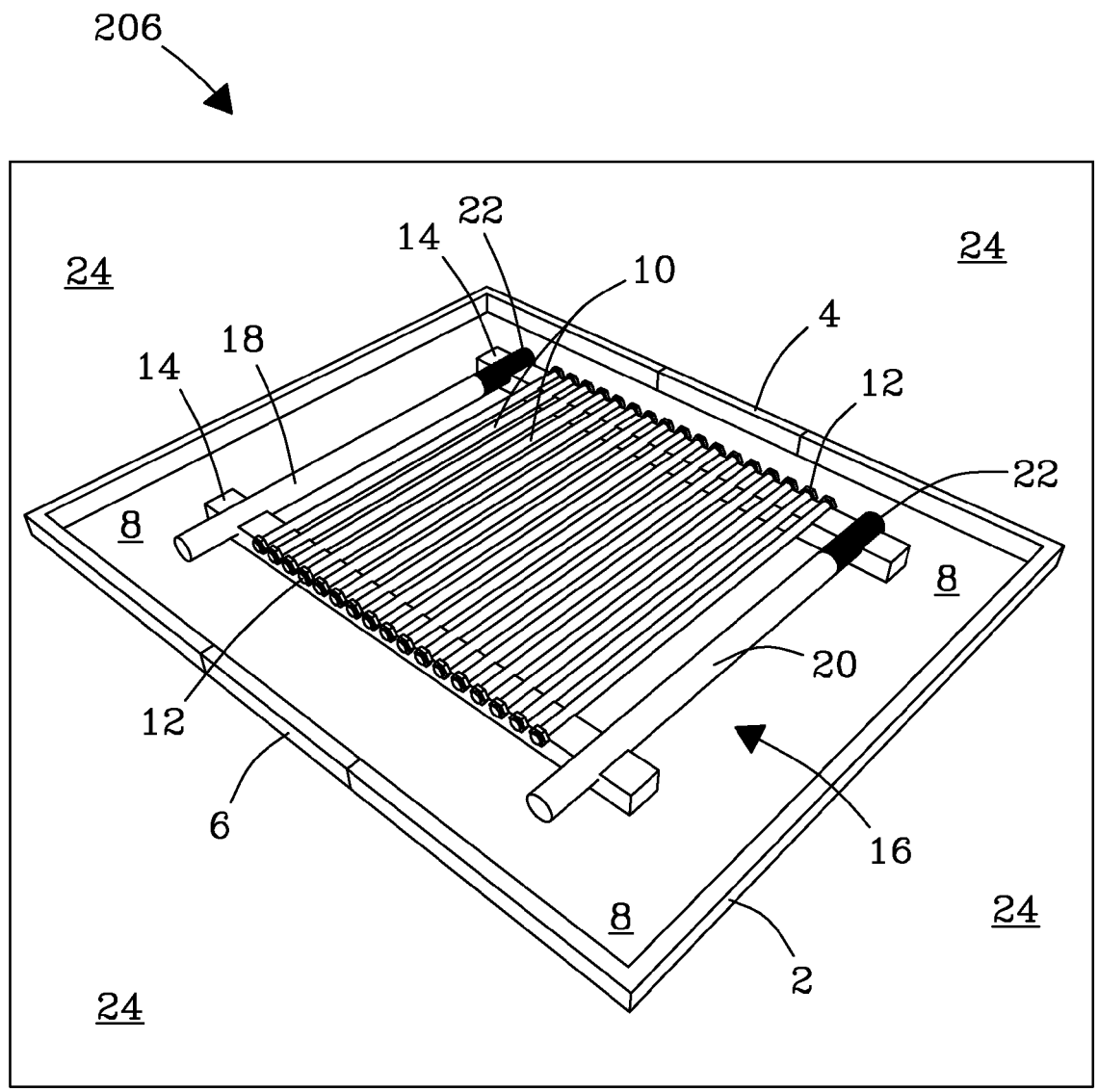
Figure 3D:
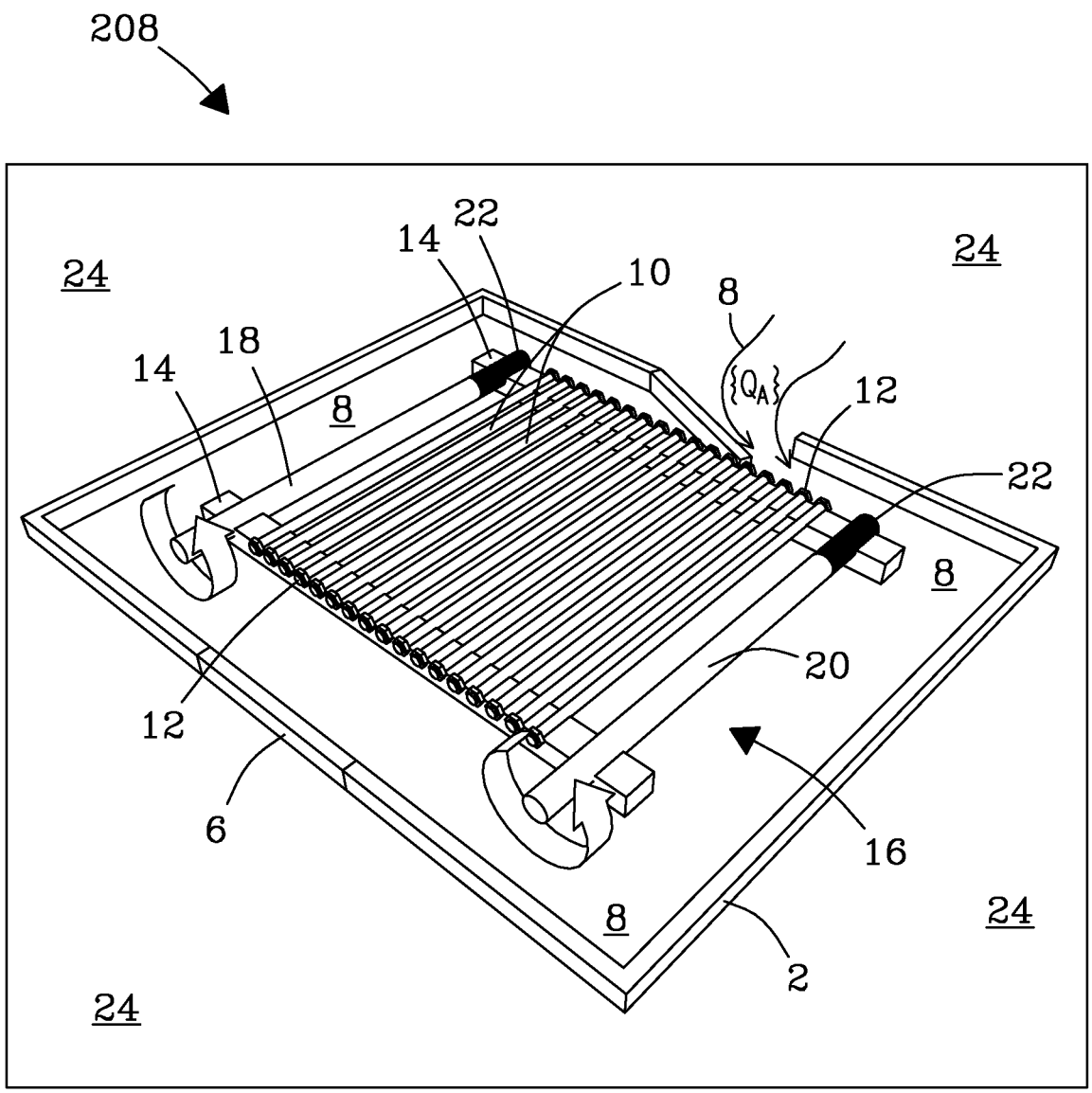

Here, ($\Delta T$) is the change in temperature, ($Q_A$) is the quantity of latent heat absorbed by the heat exchange medium 8 in chamber 2, and (Cp) is the specific heat capacity of the heat exchange medium 8. ($Q_A$) is typically less than ($Q_T$) due to the lost heat exchange efficiency. Thus, temperature reached in chamber 2 is a function of the total heat ($Q_A$) absorbed by the heat exchange medium 8 (i.e., that is released from the refrigerant rods 10) and the heat capacity (Cp) of the heat exchange medium 8 in chamber 2. In some embodiments, the heat exchange medium 8 in chamber 2 experiences a temperature increase of at least about 2° C. above the ambient temperature. In other embodiments, the temperature increase of the heat exchange medium in chamber 2 is at least about 2° C. above the ambient temperature to about 70° C. above the ambient temperature in chamber 2. As will be understood by those of ordinary skill in the thermodynamic arts, the range of temperatures of the heat exchange medium 8 in chamber 2 can range from ambient temperature to the highest temperature reached by rods 10 as they absorb or release latent heat ($Q_L$) in chamber 2. Thus, no limitations are intended. In another step {204} illustrated in FIG. 3b, exit 6 to chamber 2 is opened, allowing latent heat ($Q_L$) accumulated in chamber 2 to be released from chamber 2 through exit 6 by thermal equilibration of the exchange medium 8 in a target area 22, location 22, or environment 22 external to chamber 2 that is at ambient temperature. Release of heat ($Q_L$) from chamber 2 cools chamber 2, allowing the temperature in chamber 2 to reach thermal equilibrium with the environment 22 (target location or area) external to chamber 2. In some embodiments, step {202} and step {204} are performed separately. In some embodiments, step {202} and step {204} are performed simultaneously to save time. In another step {206} illustrated in FIG. 3c, once temperature equilibrium is reached in environment 22 external to chamber 2, exit 6 to chamber 2 is dosed. Upper screw drive 18 and lower screw drive 20 are locked in position to maintain the stress on refrigerant rods 10. Locking of rods 10 in system 100 retains the solid refrigerant in the high-energy Martensite state, which is otherwise thermodynamically unstable. In this locked state, system 100 is ready to cool chamber 2 upon demand. Locking of screw drives 18 and 20 can be performed, e.g., in conjunction with a ratchet gear (not shown) or other similar locking device as will be understood by those of ordinary skill in the mechanical arts. In a heat absorbing step {208} illustrated in FIG. 3d, upper screw drive 18 and lower screw drive 20 are unlocked, releasing the stress exerted on refrigerant rods 10, which transforms the solid refrigerant in rods 10 back to the low-energy austenite state. Transformation of the solid refrigerant to the low-energy austenite state allows the solid refrigerant in rods 10 to absorb heat ($Q_A$) from the heat exchange medium 8 contained within chamber 2. The temperature of the heat exchange medium 8 within chamber 2 begins to decrease. In a final step {210} illustrated in FIG. 3d, the temperature of the exchange medium 8 in chamber 2 reaches a desired or selected temperature, exit 6 to chamber 2 is opened, which distributes the cold medium to target area 22. The hot exchange medium 8 in target area 22 external to chamber 2 enters chamber 2, which serves to cool target area 22. In some embodiments, step {208} and step {210} are performed separately. In some embodiments, step {208} and step {210} are performed simultaneously to save time. In some embodiments, system 100 stores cold energy in refrigerant rods 10 that are placed in a preselected location or environment at night when the temperature is low or the total amount of energy required for the system to share cold energy is low (e.g., when energy costs are low) and deploys the cold energy stored in the solid refrigerant during the daytime when energy demands are higher. {END}.

Solid Refrigerant Materials

Solid refrigerants in accordance with the invention include, but are not limited to, e.g., alloys and metal-containing alloys that provide preselected changes in enthalpy for intended applications. In some embodiments, alloys include metals and materials including, but not limited to, e.g., nickel (Ni), aluminum (Al), titanium (Ti), copper (Cu), zinc (Zn), titanium (Ti), hafnium (Hf), zirconium (Zr), iron (Fe), cobalt (Co), manganese (Mn), gallium (Ga), bismuth (Bi), strontium (Sr), carbon (C), including combinations of these materials. In some embodiments, the alloy is a bi-metal alloy. In one embodiment, the bi-metal alloy comprises nickel (Ni) and titanium (Ti). In one embodiment, the bi-metal alloy includes an atomic ratio [(50+X):(50−X)] for each metal of the alloy, where X=0 to 10. In one embodiment, each metal is about 50% of the total metal content by mole in the alloy. In other embodiments, the alloy contains multiple metals or is a multi-component alloy. Other alloys are within the scope of the invention. Thus, no limitations are intended.

Structured Forms

Solid refrigerants of the invention may take any structured form or shape that allows the solid refrigerant material to be: 1) deformed in a Martensite state, 2) retained (i.e., locked) in the deformed state for a preselected period, and 3) subsequently released (i.e., unlocked) and returned to the non-deformed or austenite state. Structured forms and shapes include, but are not limited to, e.g., rods, bars, wires, wafers, discs, plates, buttons, pellets, spheres, beads, particles, ribbons, meshes, tubes, tapes, pencils, or other structured forms and shapes, including combinations of these various forms and shapes. No limitations are intended. In various embodiments, the structured forms or shapes may be fashioned by processes including, but not limited to, e.g., pressing, casting, extruding, stretching, bending, twisting, pelletizing, or other manufacturing processes including combinations of these various processes. No limitations are intended.

Deformation Tolerances for Solid Refrigerants

Solid refrigerants have tolerances for deformation that range from 0% to about 10% by deformation strain (e.g., 1 cm to ≤1.1 cm; or 1 m to ≤1.1 m and etc.). In other embodiments, deformation tolerances range from about 0% to about 25% by deformation strain (e.g., 1 cm to ≤1.25 cm; or 1 m to ≤1.25 m and etc.). In yet other embodiments, deformation tolerances range from about 0% to about 100% by deformation strain (e.g., 1 cm to ≤2 cm; or 1 m to ≤2 m and etc.). In still yet other embodiments, deformation tolerances range from about 0% to about 200% by deformation strain (e.g., 1 cm to ≤3 cm; or 1 m to ≤3 m, and etc.). The solid refrigerant can be shaped so as to have a structured form that provides preselected deformation tolerances for intended applications and devices.

Cooling Energy Density

Figure 4:
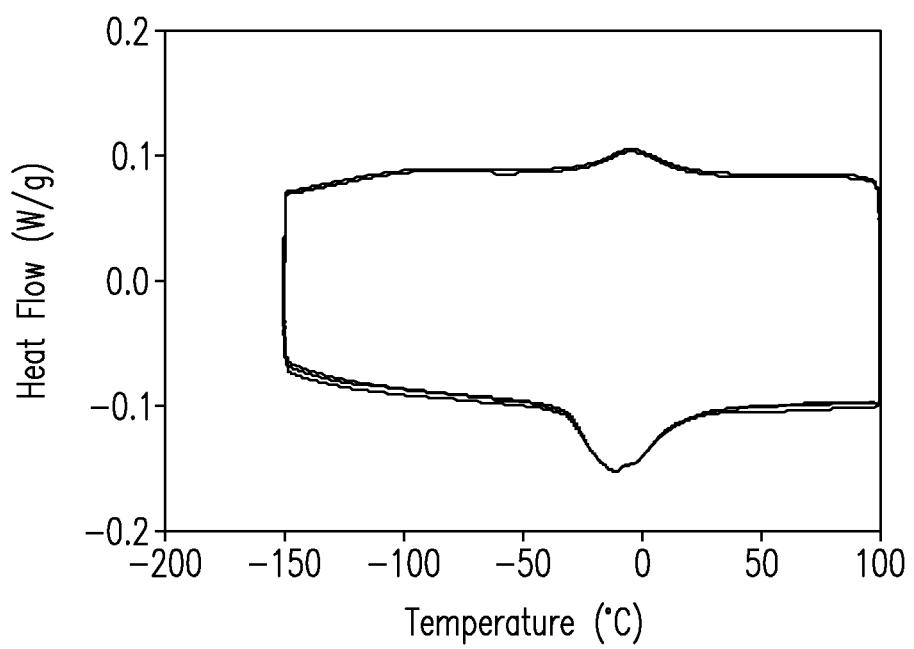
FIG. 4 is a differential scanning calorimetry (DSC) plot showing the thermal cycling of a bimetal alloy, according to one embodiment of the invention.

The present invention completely eliminates need for halofluorocarbon (HCFC) refrigerants and other conventional refrigerants known in the art that are environmentally unfriendly or otherwise problematic. Moreover, the present invention, for the first time, provides a way to store cold energy in a form other than ice or by gas liquefaction. Solid refrigerants described herein are more efficient than conventional HCFC refrigerants (e.g., SUVA® R410, E. I, du Pont de Nemours and Company (DuPont), Wilmington, Del., USA) known in the art. Systems of the invention described herein further provide at least a 50% better efficiency difference than conventional vapor-compression cooling systems known in the art. Embodiments of the invention also provide a smaller footprint for operation. For example, storing cold energy in accordance with the invention has the potential to provide volume/space savings due to cooling energy density differences of the solid refrigerant. For example, a bi-metal alloy containing, e.g., 50% nickel (Ni) and 50% titanium (Ti), has a power density of about 130 J/cm$^3$. A conventional HCFC refrigerant has a power density of less than 3 J/cm$^3$. FIG. 4 presents a differential scanning calorimetry (DSC) plot that shows repeated thermal cycling of a (Ni)—(Ti) bi-metal alloy. Latent heat ($Q_1$) remains the same regardless of how phase transformation is induced. Phase transformation of the solid refrigerant may be caused by a mechanical stress, by temperature changes, in concert with magnetic fields (e.g., magnetic cooling), in concert with electrical fields (e.g., electrocaloric cooling), or by various combinations of these transformation stressors. Thus, the invention can be expected to find application in various industries. Applications include, but are not limited to, e.g., air conditioning, and air conditioning devices; large-scale devices for home, transportation applications and systems (e.g., delivery vehicles), and like devices and like applications; refrigeration devices; and like applications.

While exemplary embodiments of the present invention have been shown and described herein, it will be apparent to those skilled in the art that many changes and modifications may be made without departing from the invention in its true scope and broader aspects. The appended claims are therefore intended to cover all such changes and modifications as fall within the spirit and scope of the invention.

What is claimed is:

1. A process for cooling a heat exchange medium, the process comprising:
    transforming a solid material from a first phase to a second phase by cooling said preselected solid material
    retaining the solid material in the second phase using a mechanical means until a preselected event;
    cooling an exchange medium by releasing the mechanical means so as to allow the preselected solid material to undergo a phase change from the second phase back to the first phase absorbing heat from and exchange medium; and
    reusing said preselected solid material to repeat this process.

2. The process of claim 1, wherein the solid material is a bi-metal alloy comprising nickel (Ni) and titanium (Ti).

3. The process of claim 2, wherein the solid material comprises nickel at a concentration between 0 atom % and 60 atom %.

4. The process of claim 1 wherein the solid material is a tri-metal alloy.

5. The process of claim 1, wherein the solid material has a strain tolerance for deformation that is at least about 10% in at least one dimension.

6. The process of claim 1, wherein the solid material has a strain tolerance for deformation of up to about 21% in at least one dimension.

7. The process of claim 1, wherein the exchange medium is selected from the group consisting of air, water, or an organic fluid.

8. The process of claim 7, wherein the organic fluid is ethanol.

9. The process of claim 1, wherein said solid material is configured in the shape of a rod.

10. A process for storing and releasing cold, the process comprising:
    transforming a preselected solid material from a first phase to a second phase by cooling said preselected solid material; and retaining the solid material in the second phase using a mechanical means until a preselected event;

cooling an ethanol exchange medium by releasing the mechanical means such that the preselected solid material converts from the second phase to the first phase absorbing heat from the ethanol exchange medium.

* * * * *